United States Patent [19]

Muto et al.

[11] 4,179,727
[45] Dec. 18, 1979

[54] CONTROL DEVICE FOR A PULSE-WIDTH MODULATED INVERTER

[75] Inventors: Nobuyoshi Muto; Yasuo Matsuda; Kazuo Honda, all of Hitachi, Japan

[73] Assignee: Hitachi, Ltd., Japan

[21] Appl. No.: 852,980

[22] Filed: Nov. 18, 1977

[30] Foreign Application Priority Data

Dec. 1, 1976 [JP] Japan .................. 51-143361

[51] Int. Cl.² ........................................ H02M 7/515
[52] U.S. Cl. .......................................... 363/41; 363/96
[58] Field of Search ..................... 363/41, 42, 96, 97

[56] References Cited

U.S. PATENT DOCUMENTS

4,063,143  12/1977  Forstbauer ................. 363/41 X

FOREIGN PATENT DOCUMENTS

1380730  1/1975  United Kingdom .................. 363/42

Primary Examiner—William M. Shoop
Attorney, Agent, or Firm—Craig and Antonelli

[57] ABSTRACT

A control device for a pulse-width modulated inverter comprises means for generating as a carrier wave a triangular wave synchronizing with an AC output from the inverter, means for generating as a modulating wave a train of rectangular wave pulses which synchronize with the triangular wave and have a width corresponding to a section effective for a modulating operation and a predetermined amplitude, voltage level setting means for setting the amplitude of the train of rectangular wave pulses, and means for modulating the triangular wave with the train of rectangular wave pulses and generating a control pulse for the AC output. The rectangular wave pulses are so set as to have a modulating level of zero in the proximity of a point corresponding to the zero point of the AC output of each phase thereby to remove a frequency divider for adjusting input frequencies of the triangular wave generating means and the modulating wave generating means and to prevent a useless modulating operation leading only to an increase in the number of commutations of the inverter.

6 Claims, 17 Drawing Figures

MODULATING WAVE AND TRIANGULAR WAVE IN U,V-PHASES

U-PHASE VOLTAGE $E_{u-o}$ $E_{u-v}(=E_{u-o}-E_{v-o})$   V-PHASE VOLTAGE $E_{v-o}$

U-V LINE VOLTAGE $E_{u-v}$

CONTROL DEVICE FOR A PULSE-WIDTH MODULATED INVERTER

LIST OF PRIOR ART REFERENCE (37 CFR 1.56 (a))

The following references are cited to show the state of the art:
1. Japanese Patent Laying-Open No. 28924/73
2. Japanese Patent Laying-Open No. 78130/74
3. Japanese Patent Laying-Open No. 132522/74
4. Japanese Patent Laying-Open No. 4531/75
5. IEEE Transactions on Industry Applications, VOL. 1A-8, No. 2, March/April 1972, pp. 145-154, entitled "Advanced Pulse-width Modulated Inverter Techniques", written by Jerry J. Pollack

BACKGROUND OF THE INVENTION

The present invention relates to a control device for an inverter, and more particularly to a control device for a pulse-width modulated inverter in which multiple pulses are modulated in pulse-width in each cycle of an AC output to control a voltage of the AC output and to reduce harmonic components of low order.

DETAILED DESCRIPTION OF THE INVENTION

In order to facilitate the understanding of the present invention, the description will first be given to a circuit arrangement of a conventional control device for a pulse-width modulated inverter as well as its modulating operation.

Figure 1:
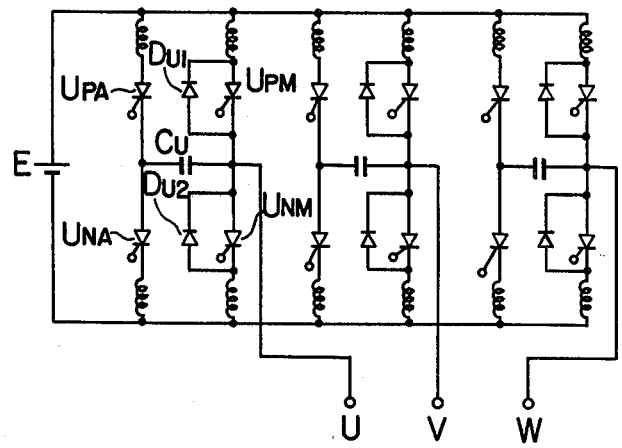
FIG. 1 is a circuit diagram showing one example of a major circuit for a pulse-width modulated inverter.

FIG. 1 shows a major three-phase six-arm circuit which has generally been used as the major circuit of a pulse-width modulated inverter in the prior art. Main thyristors in each arm such as thyristors $U_{PM}$, $U_{NM}$ in a U-phase of a three-phase alternating current are triggered and interrupted in a repetitive manner by multiple pulses which are modulated in pulse-width during a half cycle of an AC output and every half cycle thereof, thereby generating an AC output in the U-phase. The pulse-width of the trigger pulse is changed to control a voltage of the AC output. In FIG. 1 there are shown a DC supply E; three U, V, W-phase AC outputs U, V, W; auxiliary thyristors $U_{PA}$, $U_{NA}$ in the U-phase; a commutating capacitor $C_U$ in the U-phase; and discharging diodes $D_{U1}$, $D_{U2}$ in the U-phase. The multiple pulses are generated in such a manner that a triangular wave used as a carrier wave is modulated by a modulating wave of a step waveform made approximate to a sine wave. In such a pulse-width modulated inverter, it is necessary to control the triggering of the thyristors with the aid of the multiple pulses produced by dividing the half cycle into an odd-number multiple of three (3, 9, 15, 21, ...) in order to reduce higher harmonics of low order in the AC output and to allow an output voltage control. In this respect, the triangular wave is selected to be a 3(2 m+1) multiple of the fundamental wave frequency of the AC output, where m is a whole number.

Figure 2:
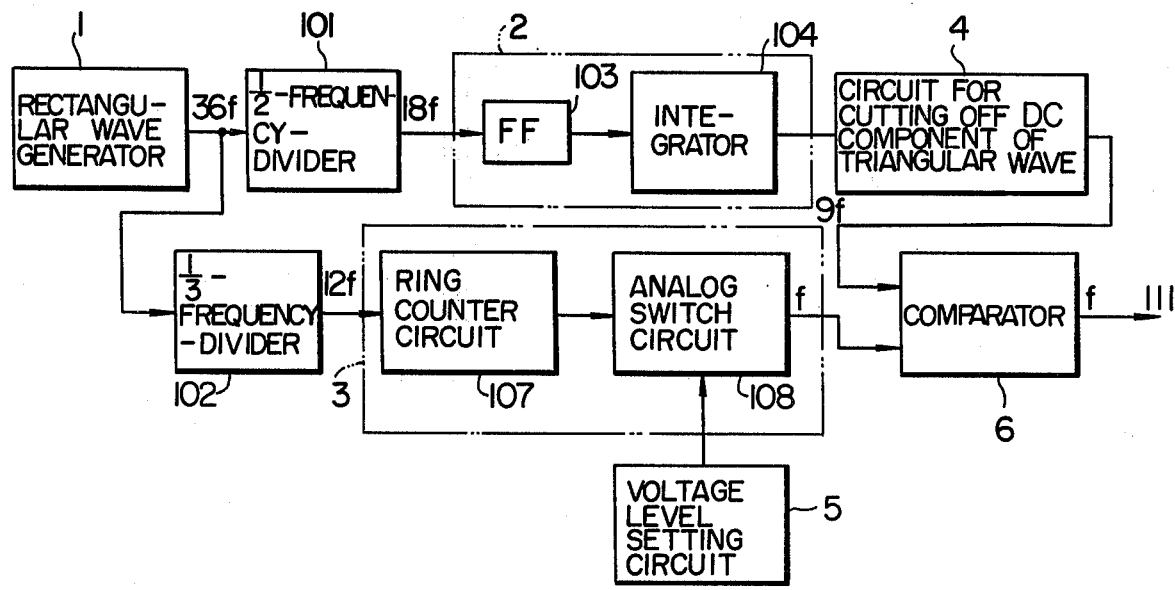
FIG. 2 is a block diagram showing a circuit arrangement of a control device for a conventional pulse-width modulated inverter.

FIG. 2 shows a block diagram of a control device for the pulse-width modulated inverter in which the conventional pulse-width modulation method is utilized. Referring now to FIG. 2, there are respectively shown a rectangular wave generator 1; a ½-frequency-divider 101; a triangular wave generator 2 including a flip-flop circuit 103 and an integrator 104; a ⅓-frequency-divider 105; a step waveform generator 108 including a ring counter circuit 107 and an analog switch circuit 108 for forming a step waveform; a circuit 4 for cutting off the DC component of the triangular wave; a voltage level setting circuit 5; and a comparator 6 for effecting a pulse-width modulation. The step waveform generator 3 is so constructed as to generate at its output a 6-step waveform of the fundamental AC output frequency f, so that it requires a rectangular wave signal of a frequency 12f at its input and the ring counter circuit 107 arranged to be a duodecimal number system.

The triangular wave generator 2 is, on the other hand, so arranged as to generate a triangular wave of a frequency 9f at its output, so that the flip-flop circuit 103 must receive a clock pulse signal of a frequency 18f at its input. To satisfy these frequency conditions, the rectangular wave generator 1 is so set that its oscillating frequency is 36f, a least common multiple of the frequencies 12f and 18f, and two clock pulse signals respectively having the frequencies 12f and 18f must be derived from the output signal of the rectangular wave generator 1 by means of the frequency dividers 101, 105.

Figure 3:
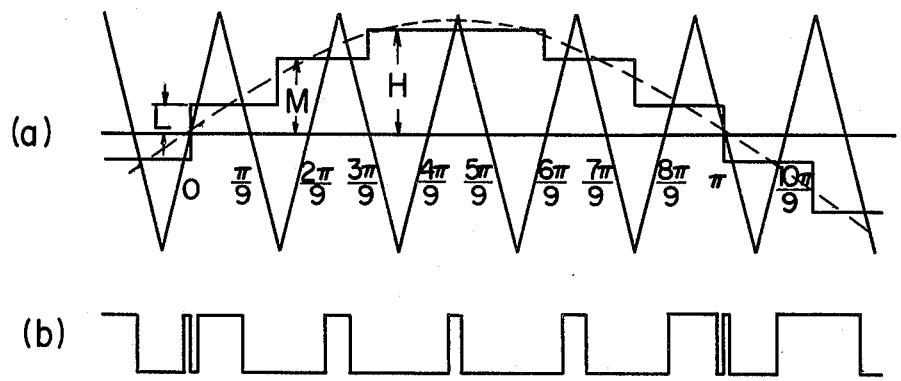
FIG. 3 is wave forms for illustrating a pulse-width modulating operation of the control device shown in FIG. 2.

FIG. 3 shows wave forms for illustrating the pulse-width modulating operation of the control device as shown in FIG. 2. FIG. 3(a) shows an example in which a triangular wave having a frequency 9f is used as a carrier wave, and a 6-step waveform is used as a modulating wave. The modulation of the triangular wave by the step waveform causes multiple pulses to be generated which are modulated in pulse-width as shown in FIG. 3(b) in a period during which the triangular wave is equal in amplitude to the step waveform or greater than it. The multiple pulses are used to control the triggering of the thyristors in the above-mentioned major circuit.

As described above, the conventional method uses the step waveform as a modulating wave, so that the carrier wave generator receives an input clock pulse different in frequency from that of the modulating wave generator. This requires a frequency divider for adjusting the frequency and hence causes complication of the circuit arrangement. As shown in FIG. 3(b), in the conventional method, a useless modulating operation increasing only the number of commutation of the thyristor was performed in the proximity of a point on the modulating wave corresponding to the zero point of the AC output. This provides no contribution to the reduction of the harmonics of low order (the third harmonics and harmonics of order of multiples of three) and only results in the reduction of efficiency of the inverter.

Accordingly, an object of the present invention is to provide a control device for a pulse-width modulated inverter made free from the above-mentioned drawbacks.

According to one aspect of the present invention there is provided a control device for a pulse-width modulated inverter comprising means for generating as a carrier wave a triangular wave synchronizing with an AC output from the inverter, means for generating as a modulating wave a train of rectangular wave pulses which synchronize with the triangular wave and have a width corresponding to a section effective for a modulating operation and a predetermined amplitude, voltage level setting means for setting the amplitude of the train of rectangular wave pulses, and means for modulating the triangular wave with the train of rectangular wave pulses and generating a control pulse for the AC output.

According to another aspect of the present invention there is provided a control device for a pulse-width modulation inverter comprising means for generating as a carrier wave a triangular wave synchronizing with an AC output from the inverter, means for generating as a modulating wave a train of rectangular wave pulses which synchronize with the triangular wave and have a width corresponding to a section effective for a modulating operation and a predetermined amplitude, voltage level setting means for setting the amplitude of the train of rectangular wave pulses, and means for modulating the triangular wave with the train of rectangular wave pulses and generating a control pulse for the AC output, the train of rectangular wave pulses having a modulating level of zero in the proximity of a point corresponding to the zero point of the AC output of each phase.

Figure 4:
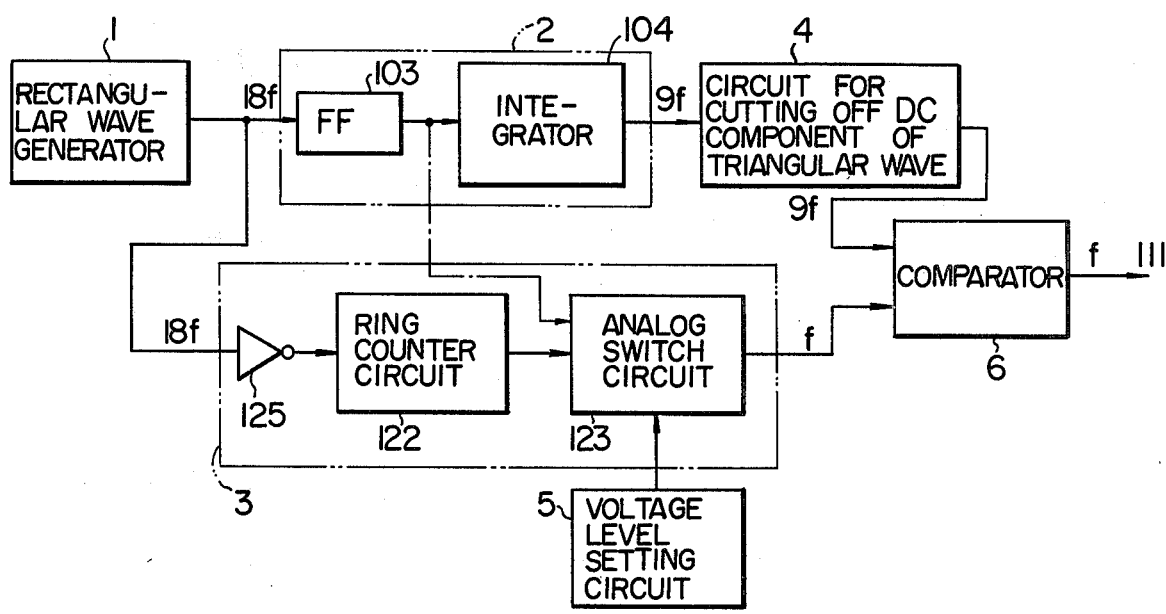
FIG. 4 is a block diagram showing a basic circuit for a pulse-width modulated inverter control device according to the present invention and one embodiment of its circuit arrangement.

In the following, the present invention will be described more fully by way of embodiments. FIG. 4 is a block diagram showing a circuit arrangement of one embodiment of a pulse-width modulated inverter control device according to the present invention.

Referring to FIG. 4, there are respectively shown a rectangular wave generator 1; a triangular wave generator 2 including a flip-flop circuit 103 and an integrator 104 for integrating a rectangular wave of a frequency 9f divided into half by the flip-flop circuit 103 and generating a triangular wave of the frequency 9f; a rectangular wave pulse generator 3 including a logic inverter 125, a ring counter circuit 122 and an analog switch circuit 123 for generating a modulating wave which synchronizes with the triangular wave and has a modulating level only in a section at which the modulating operation is performed; a circuit 4 for cutting off the DC component of the triangular wave; a circuit 5 for setting a voltage level of the modulating wave; and a comparator for comparing the amplitude of the triangular wave used as the carrier wave with that of the rectangular wave used as the modulating wave and generating multiple pulses modulated in pulse-width in a period during which the triangular wave is equal in amplitude to the modulating wave or greater than it.

Figure 5:
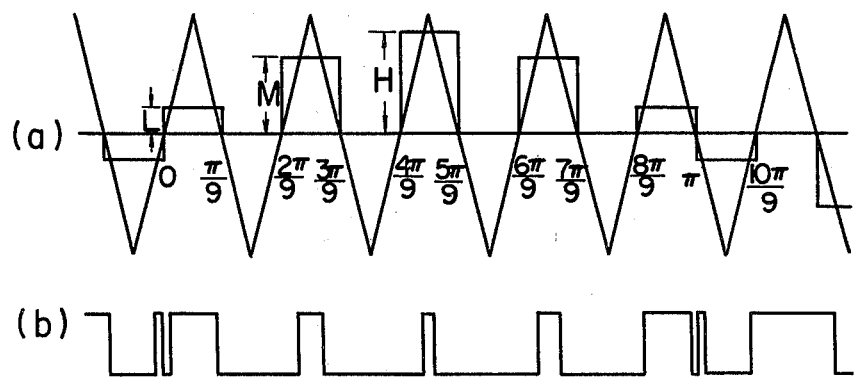
FIG. 5 is a wave forms for illustrating a pulse width modulating operation of the basic circuit for the control device shown in FIG. 4.

FIGS. 5(a) and (b) are wave forms for illustrating a pulse-width modulating operation of a basic circuit of the control device according to the present invention, i.e., a circuit in which the output from the flip-flop circuit 103 in the control device of the invention as shown in FIG. 4 is not connected to the analog switch circuit 123 and in the case where there is not provided such a wiring therebetween as indicated by a dot-dash line. FIG. 5(a) shows a relation between the triangular wave used as the carrier wave and the modulating wave of a train of rectangular wave pulses according to the present invention. FIG. 5(b) shows a wave form of an output from the comparator 6. It will be apparent from the figures that the useless modulating operation leading only to an increase in the number of commutations of the inverter takes place in the proximity of points on the modulating wave corresponding to the zero points of the amplitude of the AC output.

Figure 6:
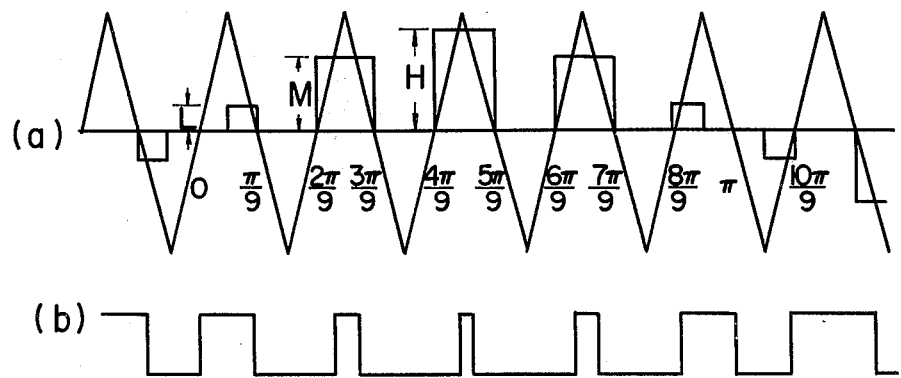
FIG. 6 is wave forms for illustrating a pulse-width modulating operation in which a modulating wave in the embodiment of the control device in FIG. 4 is set to have a modulating level of zero in the proximity of a point corresponding to the zero point of the AC output.

FIGS. 6(a), (b) are wave forms for illustrating a pulse-width modulating operation in one embodiment of the present invention, in which the output from the flip-flop circuit 103 in the control device of the present invention in FIG. 4 is connected to the analog switch circuit 123 as indicated by the dot-dash line in FIG. 4. The detailed description on its pulse-width modulating operation will be made later. FIG. 6(a) shows a relation between the triangular wave used as the carrier wave and the modulating wave of a train of rectangular wave pulses according to the present invention, and FIG. 6(b) shows a wave form from the comparator 6 in an example where no modulation leading only to the increase in the number of commutations of the thyristor is caused to occur in the proximity of the point on the modulating wave corresponding to the zero point in the amplitude of the AC output.

Figure 7:
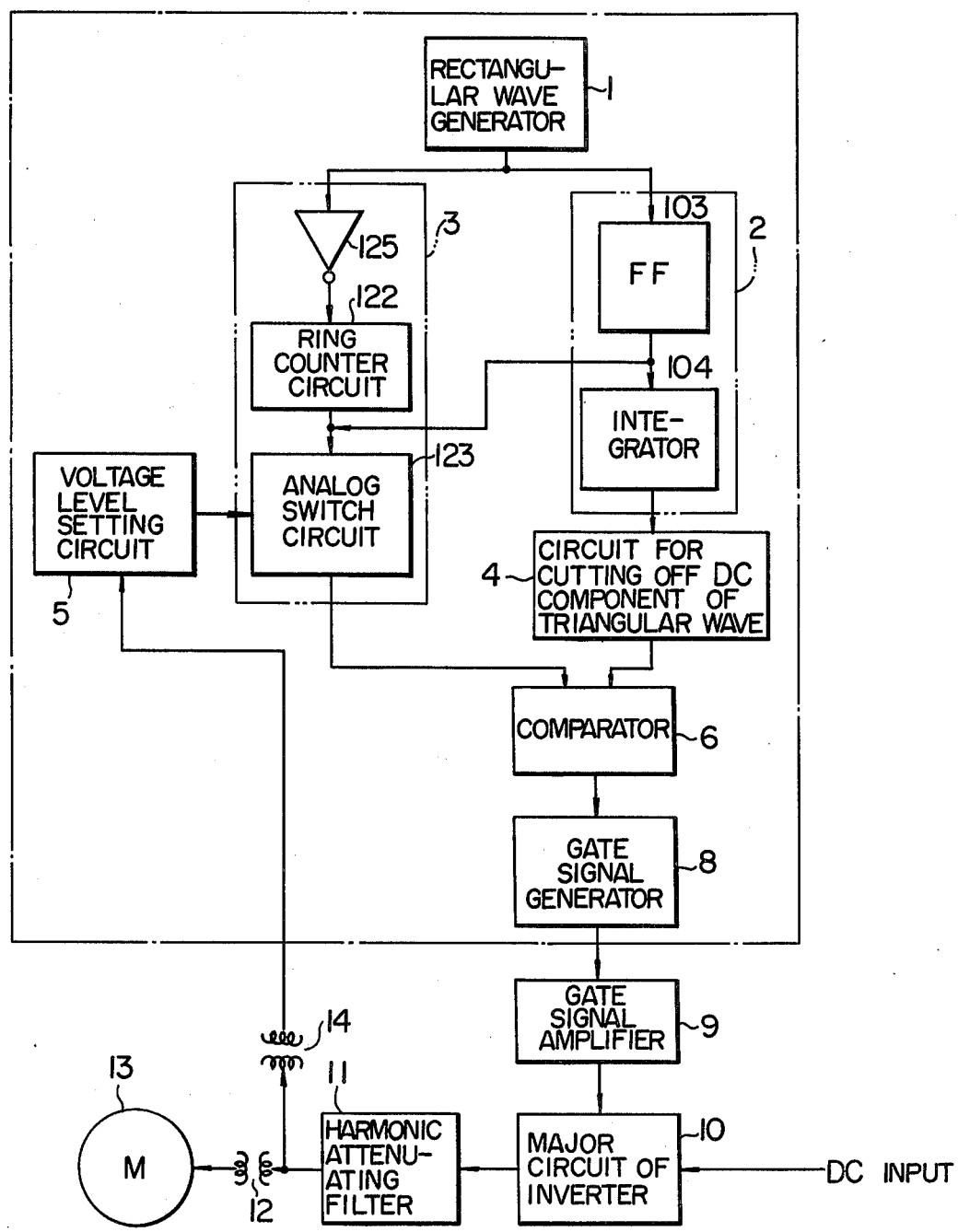
FIG. 7 is a block diagram showing a circuit arrangement in which the present invention is applied to an inverter for driving an AC motor at a constant speed.

FIG. 7 shows a whole circuit arrangement of the pulse-width modulated inverter according to the present invention, which is used to drive an AC motor at a constant speed. In the figure, the output from the comparator 6 is converted to a trigger controlling pulse for each thyristor of the major circuit of the inverter by means of a gate signal generator 8, the output from which is, after amplification by a gate signal amplifier 9, supplied to the gate terminal of each thyristor in the major circuit of the inverter. As a result, the major circuit of the inverter convertes a DC power input into a three-phase AC power, which is supplied to a three-phase AC motor through a harmonics attenuating filter 11 and an output transformer 12.

The output voltage from the filter 11 is taken out at a point between the filter 11 and the output transformer 12 through a voltage detecting transformer 14, and then fed back to the voltage level setting circuit 5, which controls the output level of the pulse train from the analog switch circuit 123 so that the voltage from the filter may be coincident with an instructed value of voltage. Thus, the three-phase AC output from the major circuit of the inverter is controlled to be always of constant amplitude.

FIGS. 8 to 12 show a circuit arrangement in each block in FIG. 7 and time charts for illustrating its operation. The reference numerals correspond to those used in each block in FIG. 7.

Figure 8:
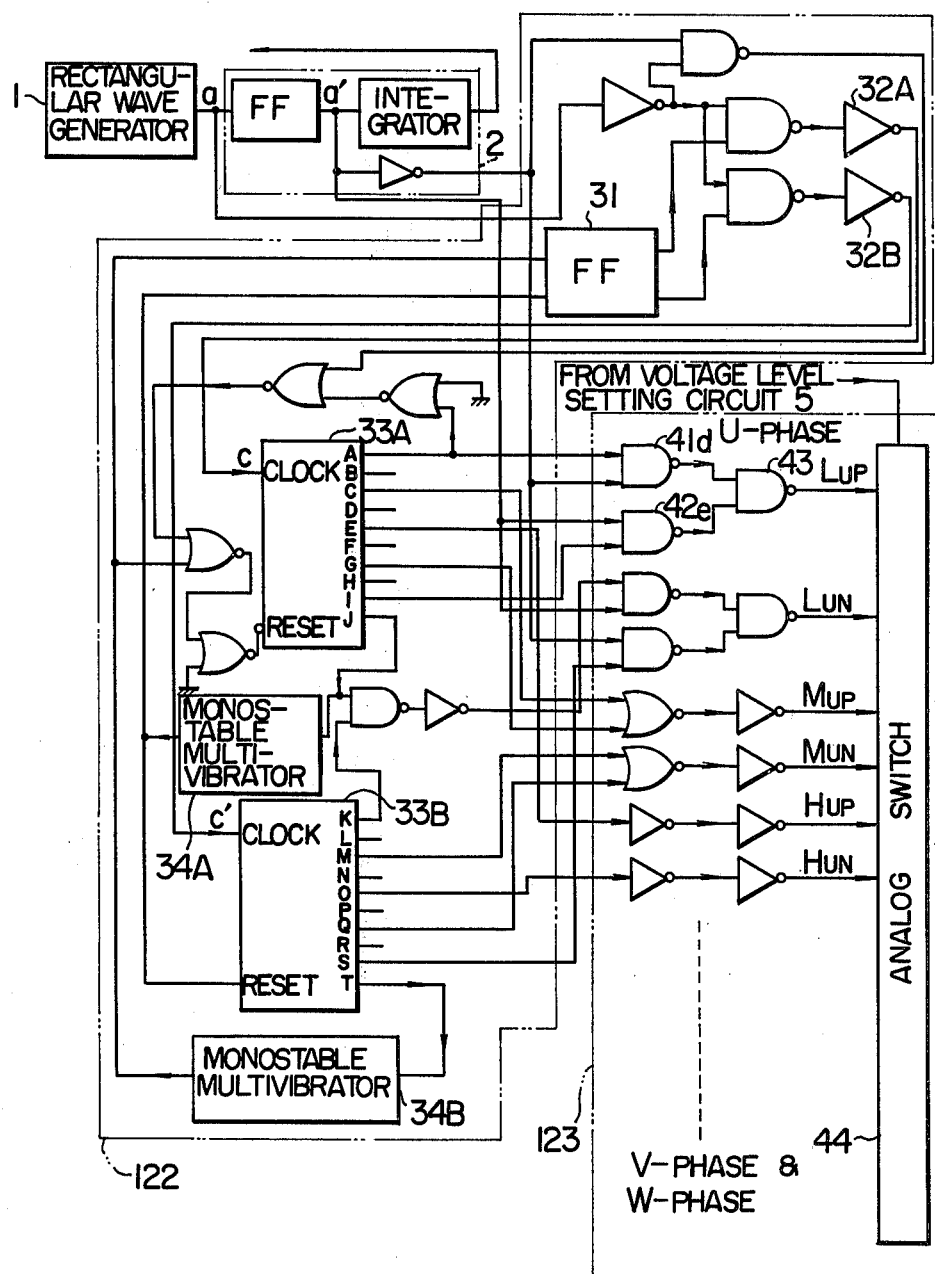
FIG. 8 is a schematic block diagram showing particular arrangements of a modulating wave generator and a carrier wave generator in the circuit of FIG. 7.
Figure 9:
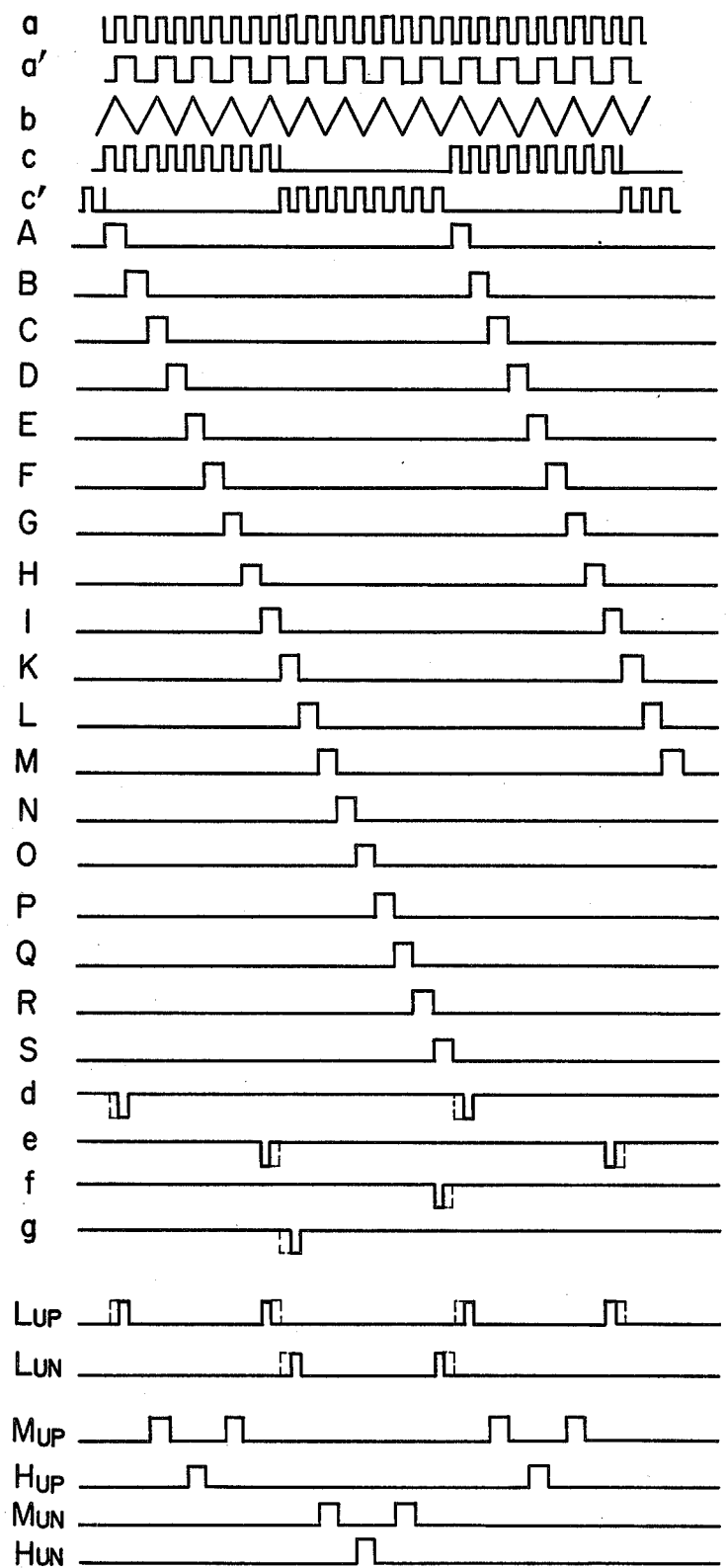
FIG. 9 is a time chart for illustrating operations for a U-phase of three-phase alternating current in the modulating wave generator and the carrier wave generator in FIG. 8.

Referring to FIG. 8, clock pulses (a) generated by the rectangular wave generator 1 are supplied to the triangular wave generator 2 and the rectangular wave pulse train generator 3. The triangular wave generator 2 divides the frequency of the clock pulse (a) into half to generate a pulse (a'), which is applied to the integrator 104 and integrated to generate a triangular wave (b). The ring counter circuit 122 may comprise one octodecimal counter, but comprises two decimal counters 33A, 33B in the present embodiment. The octodecimal counter is formed by the two decimal counters, so that they are switched alternately. The switching is carried out by a flip-flop circuit 31. The clock pulse (a) is supplied to the decimal counters 33A, 33B through the logic inverter 125 and logic gates, respectively. The switching occurs in response to outputs of the logic gates and outputs at Q, $\bar{Q}$ of the flip-flop circuit 31 at a cycle corresponding to a half cycle of the AC output for alternate application to the clock inputs of the decimal counters 33A, 33B. The clock pulses are such as shown in FIGS. 9(c), (c'). The decimal counter 33A generates ten pulses shifted by one clock pulse, and, after it has generated nine timing signals A to I, triggers a monostable multivibrator 34A at the rising edge of the tenth pulse to generate an output pulse, which resets the flip-flop circuit 31. At the same time the flip-flop circuit 31 is reset, the clock pulse C' is applied to the clock input of the decimal counter 33B, which similarly generates ten pulses and triggers a monostable multivibrator 34B at the rising edge of the tenth pulse after the generation of nine timing signals K to S. The output pulse from the multivibrator 34B again sets the flip-flop circuit 31 with the result that the clock pulse (a) is applied to the clock input of the decimal counter 33A through the logic inverter. Such successive operations cause the ring counter circuit 122 to produce eighteen timing signals. However, such a switching circuit is not required if one counter of 20 bits is used. The analog switch circuit 123 is provided with gate circuits for suppressing former or latter halves of the timing signals A, I, K, S from the ring counter circuit 122 with the aid of the clock pulse (a') generated by the triangular wave generator in view of the fact that the angle of the cancelled portion of the modulating wave must be within about ten degrees of the proximity of the point on the modulating wave corresponding to the zero-crossing point in the half cycle of the AC output. For example, a NAND circuit 41 receives the timing signal A and an inverted signal of pulse (a') from the triangular wave generator 2, and generates a timing signal (d) with its former half suppressed. Further, a NAND circuit 42 receives the timing signal I and the signal (a') to generate a timing signal (e) with its latter half suppressed. The outputs of both the NAND gates 41, 42 are further applied to a NAND circuit 43 to generate a positive side gate signal $L_{UP}$ for an L-level in the U-phase. Further, a positive side gate signal $M_{UP}$ for an M-level in the U-phase is generated by the timing signals C, G, as is apparent from FIG. 8, and a positive side gate signal $H_{UP}$ for an H-level is generated by the timing signal E. Similarly, negative side gate signals for the M and H-levels are generated by the timing signals M, Q, O. It is to be noted that, although only the gate circuits for the U-phase are shown in the analog switch circuit 123, timing signals for V and W-phases are generated from the decade counters 33A, 33B as a group of six timing signals which are shifted by $\frac{2}{3}\pi$ in phase to each other.

Figure 10:
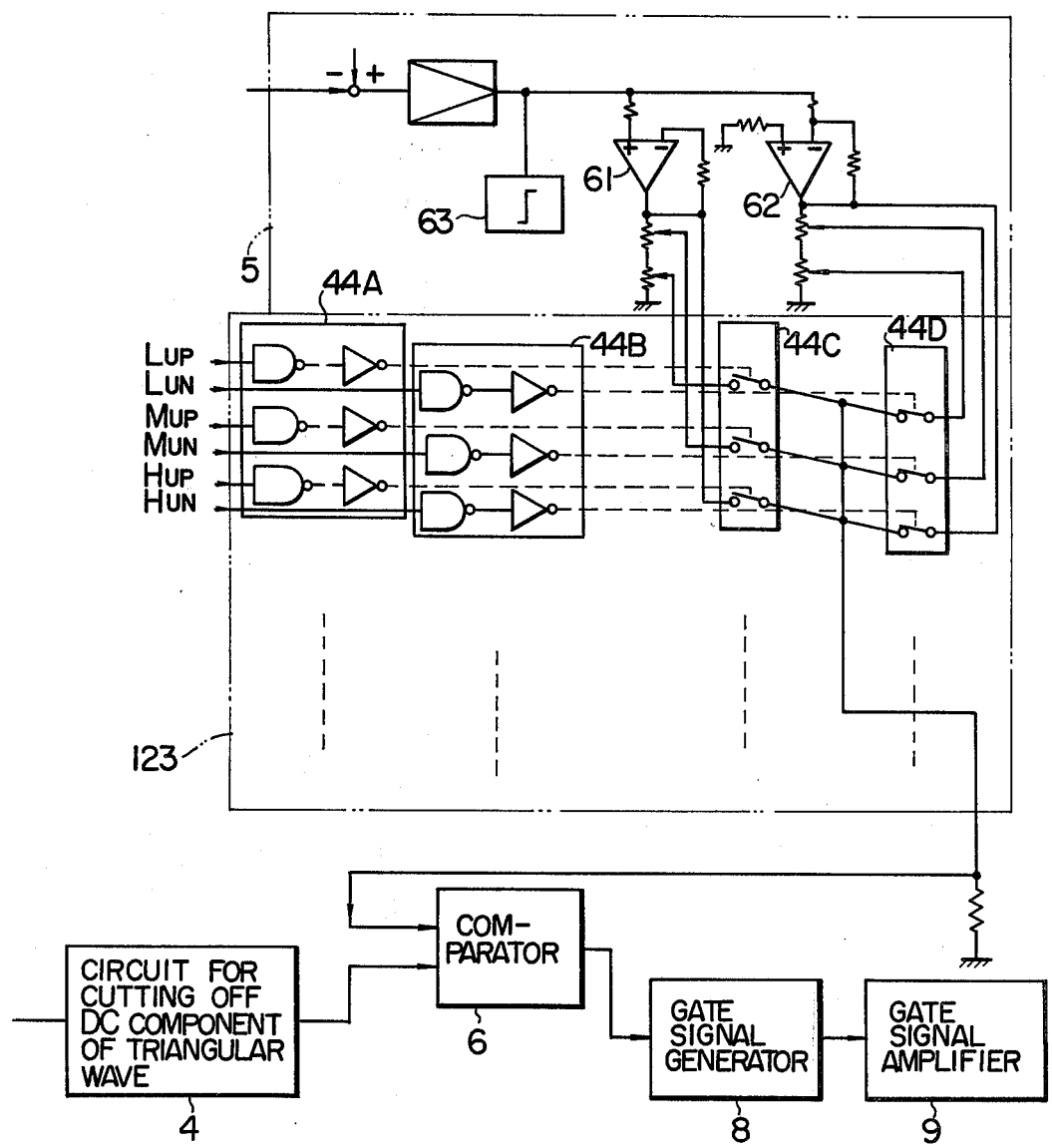
FIG. 10 is a schematic block diagram showing particular arrangements of a voltage level setting circuit and an analog switch circuit in FIG. 7.

Referring next to FIG. 10, the analog switch 44 of the analog switch circuit 123 performs switching operations for switch circuits 44C, 44D (for example, semiconductor switches) by means of gate signals such as $L_{UP}$, $L_{UN}$ applied through buffer circuits 44A, 44B. The voltage level setting device 5 detects a difference between a set reference voltage and the AC output voltage of the inverter and applies it to operational amplifiers 61, 62 with an output voltage of positive polarity in a half cycle applied to the operational amplifier 61 and an output of negative polarity to the operational amplifier 62. The outputs from these amplifiers are respectively divided in voltage through potentiometers to produce switching voltages for each gate signal $L_{UP}$, $M_{UP}$... of the analog switch circuits 44C, 44D. These switching voltages are, for example, set to be L:M:H=0.269:0.732:1, and made conicident with a ratio of levels at each phase of the sine wave. The switching voltage becomes at maximum at the smallest pulse-width by which the commutation condition for the inverter can be surely satisfied, and a limiter 63 is provided whose upper limit is set equal to the maximum value. A switching signal produced from the analog switch 44 is a modulating wave comprising a train of rectangular wave pulses which are symmetrical in polarity and different in level as shown in FIG. 12(a). The modulating wave is compared in the comparator 6 with the triangular wave with its DC component cut off, thereby generating a train of multiple pulses sinusoidally modulated in pulse-width as shown in FIG. 12(b).

Figure 11:
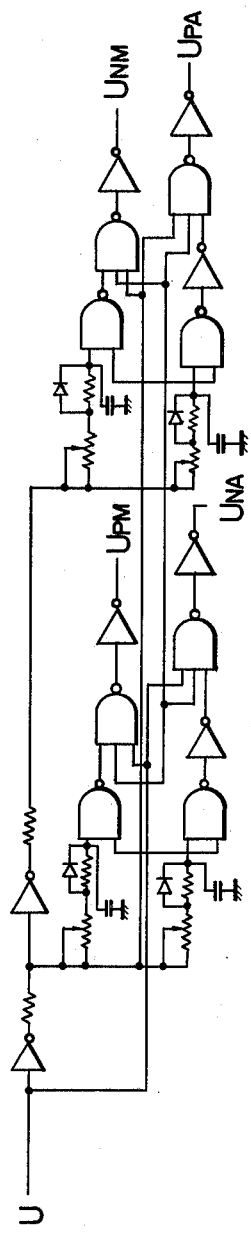
FIG. 11 is a schematic circuit diagram showing a particular arrangement of a gate signal generator in FIG. 7.

FIG. 11 shows a circuit arrangement for the U-phase of the gate signal generator 8. When the train of pulses modulated in pulse-width as shown in FIG. 12(b) are applied to an input terminal U as shown in FIG. 11, control signals for the main thyristors $U_{PM}$, $U_{NM}$ of the U-phase and the auxiliary thyristors $U_{PA}$, $U_{NA}$ of the U-phase as shown in FIGS. 12(c) to (f) are produced at respective output terminals. The circuit in FIG. 11 is provided with monostable multivibrators of the integration type to delay the phase to provide the triggering signal of the main thyristor with a sufficient commutation period and to obtain a triggering pulse-width for the auxiliary thyristor. The integrator includes a diode in parallel with a resistor to provide characteristics of rapid charging and slow discharging. This makes the charging time constant small, thereby preventing irregularities in the triggering phase of the main thyristor and the pulse-width of the auxiliary thyristor.

Figure 12:
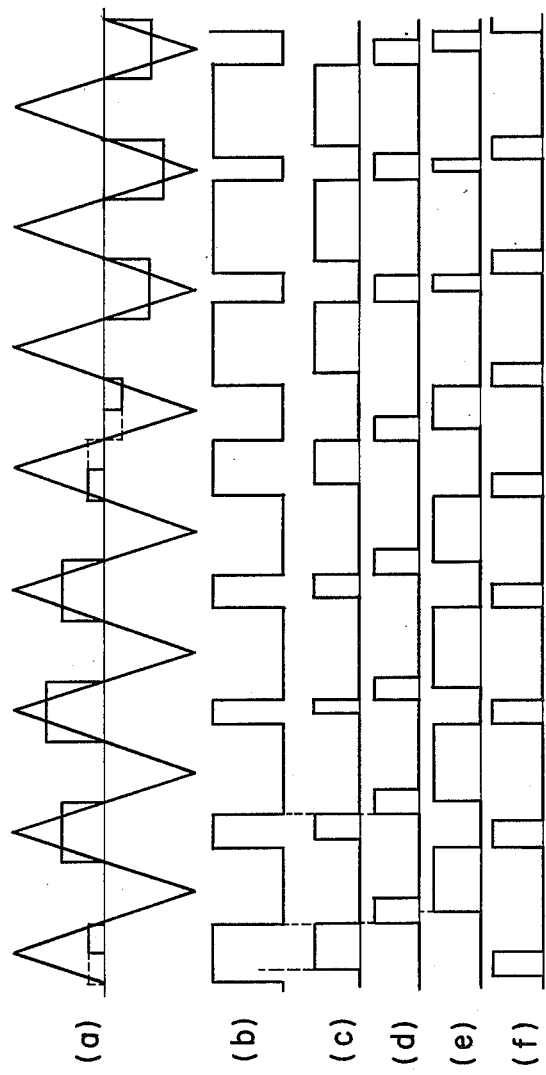
FIG. 12 is a time chart for illustrating operations for the U-phase in the gate signal generator in FIG. 11.
Figure 13A:
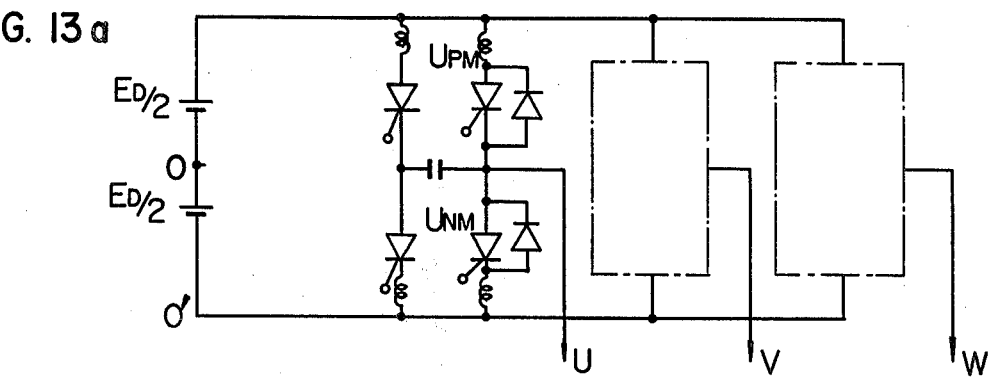
FIGS. 13a to 13e show an illustrative view for a pulse-width modulating operation according to the present invention and an AC output converting operation in the major circuit of the inverter.
Figure 13B:
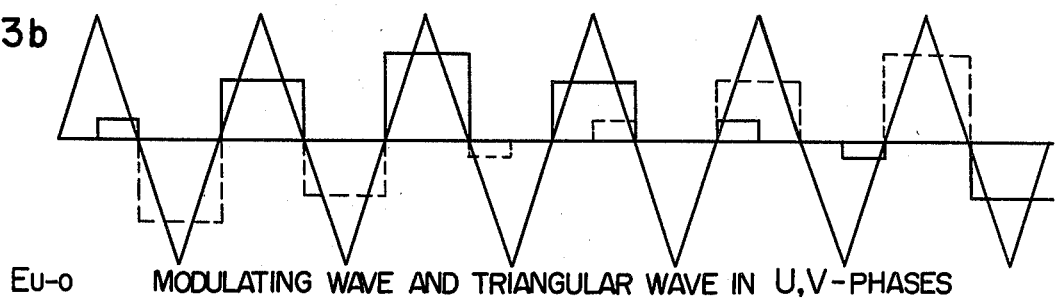
Figure 13C:
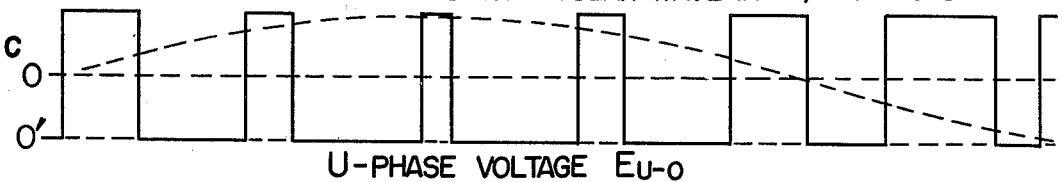
Figure 13D:
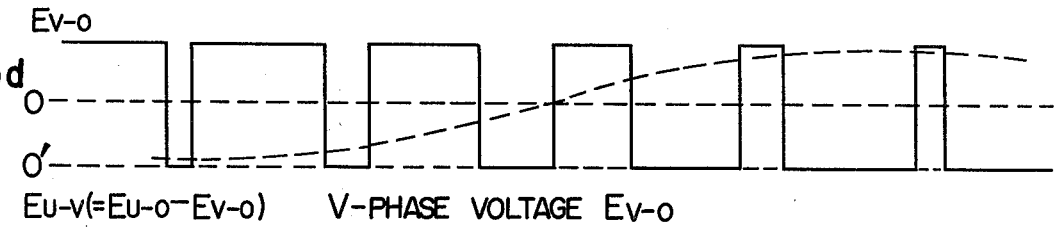
Figure 13E:
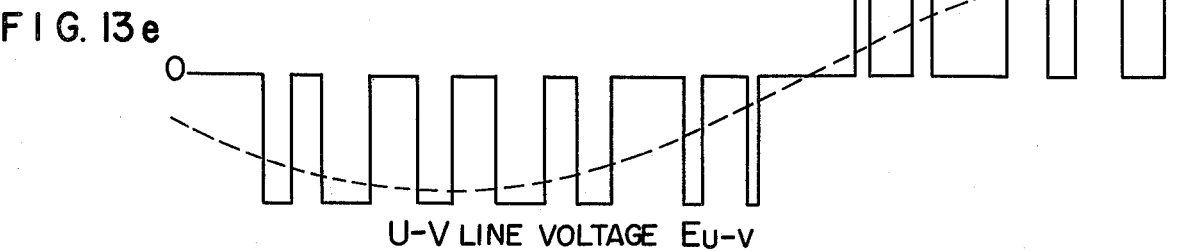

FIG. 13a shows a major circuit of three-phase six-arms adapted for use in the pulse-width modulated inverter according to the present invention, and FIG. 13b shows a phase relation between the triangular wave and modulating wave according to the present invention. A train of rectangular wave pulses shown by solid lines in FIG. 13b are a modulating wave for the U-phase, and a train of rectangular wave pulses shown by dotted lines are a modulating wave for the V-phase. FIGS. 13c to 13d show AC output voltages for the U and V-phases produced from the major circuit when the gate signals as shown in FIG. 12 are applied to each thyristor of the major circuit, and FIG. 13e shows an AC output line voltage between the U and V-phases.

As is apparent from the above description, the control device for the pulse-width modulated inverter according to the present invention can make the control circuit simplified and suppress the useless commutation of the major circuit with an improvement in conversion efficiency.

We claim:

1. A control device for a pulse-width modulated inverter comprising means for generating as a carrier wave a triangular wave synchronizing with an AC output from the inverter, means for generating as a modulating wave a train of rectangular wave pulses which synchronize with said triangular wave and have a width corresponding to a section effective for a modulating operation and a predetermined amplitude, voltage level setting means for setting the amplitude of said train of rectangular wave pulses, and means for modulating said triangular wave with said train of rectangular wave pulses and generating a control pulse for said AC output.

2. A control device for a pulse-width modulation inverter comprising means for generating as a carrier wave a triangular wave synchronizing with an AC output from the inverter, means for generating as a modulating wave a train of rectangular wave pulses which synchronize with said triangular wave and have a width corresponding to a section effective for a modulating operation and a predetermined amplitude, voltage level setting means for setting the amplitude of said train of rectangular wave pulses, and means for modulating said triangular wave with said train of rectangular wave pulses and generating a control pulse for said AC output, said rectangular wave pulse train generating means generating said train of rectangular wave pulses with a modulating level of zero in the proximity of a point corresponding to the zero point of said AC output of each phase.

3. A control device for a pulse-width modulated inverter according to claim 2, wherein said triangular wave generating means comprises a flip-flop circuit and an integrator, and said rectangular wave pulse train generating means comprises a logic inverter, a ring counter circuit and an analog switch circuit.

4. A control device for a pulse-width modulated inverter according to claim 3, wherein said ring counter comprises two decimal counters and a switch circuit for alternately switching said counters every half cycle of the AC output.

5. A control device for a pulse-width modulated inverter according to claim 2, wherein said voltage level setting means comprises a reference voltage supplying circuit, a comparator for comparing a reference voltage from said reference voltage supplying circuit with an AC output voltage to produce an output voltage which holds the level of the AC output voltage always constant, an amplifier for amplifying the output voltage from said comparator, a limiter circuit connected to an output terminal of said amplifier for maintaining an output voltage level to a predetermined value, and means for generating a positive or negative switching voltage having a predetermined level from the output voltage from said amplifier.

6. A control device for a pulse-width modulated inverter according to claim 3, wherein an output of said flip-flop circuit is connected to an input of said analog switch circuit.

* * * * *